US012439214B2

(12) United States Patent
Hasani

(10) Patent No.: US 12,439,214 B2
(45) Date of Patent: Oct. 7, 2025

(54) HEARING AID, IN PARTICULAR IN-THE-EAR HEARING AID

(71) Applicant: Sivantos Pte. Ltd., Singapore (SG)

(72) Inventor: Hamed Hasani, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 245 days.

(21) Appl. No.: 18/297,103

(22) Filed: Apr. 7, 2023

(65) Prior Publication Data

US 2023/0328466 A1 Oct. 12, 2023

(30) Foreign Application Priority Data

Apr. 7, 2022 (DE) ..................... 10 2022 203 528.3

(51) Int. Cl.
*H04R 25/00* (2006.01)

(52) U.S. Cl.
CPC ..... *H04R 25/602* (2013.01); *H04R 2225/025* (2013.01); *H04R 2225/51* (2013.01)

(58) Field of Classification Search
CPC ............ H04R 25/602; H04R 2225/025; H04R 2225/51
See application file for complete search history.

(56) References Cited

U.S. PATENT DOCUMENTS 11,140,496 B2 10/2021 Xue et al.
2020/0335855 A1* 10/2020 Chen ........................ H01Q 1/48
2021/0306773 A1* 9/2021 Kvist ....................... H01Q 1/48

FOREIGN PATENT DOCUMENTS

DE 102017207143 A1 * 10/2018 ............ H04R 25/02
EP 3836564 A1 6/2021

OTHER PUBLICATIONS

Best, Steven R.: "The Radiation Properties of Electrically Small Folded Spherical Helix Antennas," IEEE Transactions on Antennas and Propagation, vol. 52, No. 4, Apr. 2004, pp. 953-960, doi: 10.1109/TAP.2004.825799.

* cited by examiner

*Primary Examiner* — Sunita Joshi
(74) *Attorney, Agent, or Firm* — Laurence A. Greenberg; Werner H. Stemer; Ralph E. Locher

(57) ABSTRACT

A hearing aid, in particular an in-the-ear hearing aid, includes a device housing having a housing shell insertable into an auditory canal and a housing front plate closing the housing shell. A battery is accommodated in the device housing. A signal processing device having a ground plane is disposed at least in sections between the battery and the housing front plate. An antenna device, having at least two folded antenna arms, is disposed between the ground plane and the housing front plate. The antenna arms extend as three-dimensional spirals or helices along a height direction perpendicular to the ground plane, and have at least one turn or pitch. The antenna arms are electrically connected to one another by antenna poles spaced apart from the ground plane.

10 Claims, 7 Drawing Sheets

HEARING AID, IN PARTICULAR IN-THE-EAR HEARING AID

CROSS-REFERENCE TO RELATED APPLICATION

This application claims the priority, under 35 U.S.C. § 119, of German Patent Application DE 10 2022 203 528.3, filed Apr. 7, 2022; the prior application is herewith incorporated by reference in its entirety.

FIELD AND BACKGROUND OF THE INVENTION

The invention relates to a hearing aid, in particular an in-the-ear hearing aid (ITE), having a device housing with a housing shell insertable into an auditory canal and with a housing front plate which closes the housing shell and faces toward the environment in the worn state, a battery accommodated in the device housing, and a signal processing device having a ground plane disposed at least in sections between the battery and the housing front plate.

Hearing aid devices are wearable hearing aids, which are used in particular for the treatment of the hard of hearing or the hearing impaired. In order to meet the numerous individual requirements, different structural forms of hearing aid devices are provided, such as behind-the-ear hearing aids (BTE) and hearing aids having an external receiver (RIC: receiver in the canal) as well as in-the-ear hearing aids (ITE), for example also pinna hearing aids or canal hearing aids (CIC: completely-in-channel, IIC: invisible-in-the-channel). The hearing aids listed by way of example are worn on the outer ear or in the auditory canal of a hearing aid device user. In addition, however, bone vibrator hearing aids, implantable hearing aids, or vibrotactile hearing aids are also available on the market. In that case, the damaged sense of hearing is stimulated either mechanically or electrically.

Such hearing aids have in principle as important (hearing aid) components an input transducer, an amplifier, and an output transducer. The input transducer is generally an acousto-electrical transducer, such as a microphone. The output transducer is usually implemented as an electroacoustic transducer, for example as a miniature loudspeaker (receiver), or as an electromechanical transducer, for example a bone vibration receiver. The amplifier is typically integrated into a signal processing device. The energy supply is typically carried out by a battery or a chargeable accumulator.

Such hearing aids furthermore have, for example, an electromagnetic receiver, for example an antenna element as an RF antenna, through the use of which the hearing aid can be coupled for signaling, for example, to an operating element (remote control) and/or to a further hearing aid. In general, the same antenna element is used for transmitting and receiving data for reasons of space.

Hearing aids are preferably configured to be particularly space-saving and compact, so that they can be worn by a hearing aid user in the most optically inconspicuous manner. Increasingly smaller hearing aids are thus produced, which have an increasingly higher level of wearing comfort, and thus can hardly be perceived by a user when worn on or in an ear. Due to the installation space which is thus reduced, however, it is increasingly more difficult to house and/or install conventional antenna elements for wireless signal transmission in such hearing aids.

In particular in ITE hearing aids, the radiation efficiency of the antenna element integrated into the device housing and its sensitivity with respect to the environment is a problem. Due to the limited area which is available as installation space for the antenna element, the antenna element generally has only a low radiation efficiency in this case and a high sensitivity with respect to the ear shape of the hearing aid user. An antenna development process for ITE hearing aids is thus disadvantageously influenced, since every antenna element has to be individually adapted for a respective environment or ear shape. An “ear shape” is to be understood in this case in particular as the shape of an auditory canal of the ear, in which the ITE hearing aid is inserted.

In order to improve the radiation efficiency and to reduce the sensitivity with respect to the respective ear shape, it is possible, for example, to use a quasi-monopolar antenna or a PIF antenna (planar inverted F-shaped antenna, PIFA) as an antenna element in the ITE hearing aid. Alternatively, attempts can be made to arrange the antenna element further outward, in that, for example, a monopolar antenna embedded in the front plate is used, which uses the battery as the ground plane. The antenna element can also be integrated into a removal thread of the ITE hearing aid in this case. Integrating a dipole on an outer surface of the front plate is also conceivable, for example.

SUMMARY OF THE INVENTION

It is accordingly an object of the invention to provide a particularly suitable hearing aid, in particular an in-the-ear hearing aid, which overcomes the hereinafore-mentioned disadvantages of the heretofore-known devices of this general type, which in particular has an antenna element, which has a good radiation efficiency and which has a high level of robustness with respect to various ear shapes of a hearing aid user.

With the foregoing and other objects in view there is provided, in accordance with the invention, a hearing aid configured, in particular, as an in-the-ear hearing aid, thus as an ITE hearing aid. The hearing aid can be embodied as a binaural hearing aid having two individual devices. In this case, the hearing aid has a device housing having a housing shell (shell) insertable into an auditory canal of a hearing aid user and having a housing front plate (faceplate), which closes the housing shell and faces toward an environment in the worn state. A battery is accommodated in the device housing, wherein a signal processing device having a ground plane is disposed at least in sections between the battery and the housing front plate. The ground plane is in this case in particular a radio-frequency ground plane (RF ground plane) or a high-frequency ground plane (HF ground plane), thus a ground plane for electrical signals in the radio-frequency, radio-wave, or high-frequency range. A ground plane is in this case in particular a flat or substantially flat horizontal conductive surface, which can be coupled with an antenna device, for example, to reflect radio waves. The ground plane in particular forms a (second) pole of an antenna device.

According to the invention, an antenna device embodied as a folded dipole having at least two folded antenna arms is provided in this case, which is disposed between the ground plane and the housing front plate. The structural size of the antenna device or the antenna arms is advantageously reduced by the folding. The basic concept in folded (miniaturized) antennas is in particular to expand the current paths in a limited volume in order to reduce the resonance frequency. Folded antennas can substantially be classified in two categories: planar (2D) antennas having meandering or zigzag shapes, and volumetric (3D) antennas, for example having a helix shape.

According to the invention, the antenna arms are guided volumetrically as three-dimensional spirals or helices along a height direction. A three-dimensional spiral is to be understood in this case in particular as a conical spiral or conic spiral. The height direction is in this case oriented perpendicular to the ground plane and directed outward in the worn state. The spiral or helical antenna arms each have at least one turn or one pitch in this case. The spiral or helical antenna arms preferably each have at least one and one-half (1.5) turns or pitches. The antenna arms have an antenna pole on each of their antenna ends, wherein the antenna poles disposed spaced apart from the ground plane are electrically connected to one another. The other antenna end or the other antenna pole is coupled in one of the antenna arms to a (signal) feed, wherein the other antenna poles of the remaining antenna arms are electrically contacted with the ground plane and are thus electrically short-circuited with one another. A particularly suitable hearing aid is thus implemented.

According to the invention, a folded spiral or helix antenna is thus implemented on the ground plane above the battery. This antenna device utilizes the available structural volume particularly effectively, which as a consequence results in an advantageous bandwidth with respect to the antenna size. An antenna device compact with respect to installation space and having a high efficiency is thus implemented for ITE hearing aids. The antenna arms of the antenna device form a resonance structure, so that it is possible to avoid using tuning elements (e.g., inductors, capacitors). Furthermore, the antenna device is far enough away from the body materials of the hearing aid user with its axis oriented outward in relation to the ear (height direction), so that the signal properties of the antenna device depend less or substantially do not depend on the respective ear shape of the hearing aid user. In other words, the antenna device is integrated into the device housing in such a way that the antenna performance is substantially independent of the ear shape. In particular, a structurally identical antenna device can thus be used for the left and right individual device in binaural hearing aids.

Advantageous embodiments and refinements are the subject matter of the dependent claims.

In one advantageous embodiment, the antenna arms of the antenna device are advantageously disposed rotationally symmetrically and, for example, evenly distributed in relation to one another with respect to the height direction. For example, in an antenna device having two helical antenna arms, the antenna arms are disposed rotated by 180° in relation to one another with respect to the height direction.

In one suitable embodiment, the antenna device has precisely two or three antenna arms. The antenna formed by the antenna arms has an impedance having a real part and an imaginary part. The goal in this case is in particular to bring the real part at the desired frequency (for example 2.44 GHz) to a resistance of 50Ω (ohm) and dimension the imaginary part at 0Ω. It is thus possible, for example, to transmit a maximum HF power (HF: high frequency) from a Bluetooth chip to the antenna. The number of the antenna arms determines in this case the real part, wherein the number of the turns determines the imaginary part. The number of the turns is preferably selected in this case in such a way that the imaginary part is brought to 0Ω, so that a maximum antenna radiation efficiency is ensured. In other words, the number of the turns is selected in such a way that the antenna is resonant at a desired frequency (operating frequency, transmission frequency). And therefore, the number of the turns is more important than the number of the antenna arms.

In one preferred configuration, the antenna device has a hollow body overlapping the ground plane. The antenna arms are disposed on a surface, in particular on an outer surface, which faces toward the environment in the worn state. The antenna arms are thus carried or supported by the hollow body, so that the mechanical stability of the antenna device is improved by the hollow body.

In one expedient refinement, the hollow body is produced from an electrically nonconductive material. For example, the hollow body is embodied as a plastic injection molded part.

In one particularly preferred embodiment, the hollow body is produced from a plastic material suitable for laser direct structuring (LDS), wherein the antenna arms are applied by using laser direct structuring to the hollow body. In this case, to produce the hollow body, a thermoplastic is doped with a (nonconductive) laser-activatable metal compound as a plastic additive. The hollow body is produced in this case, for example, by using a single-component injection molding method from this plastic material. Subsequently, the later conductor tracks or microstrip lines of the antenna arms are written on the plastic of the hollow body using a laser beam, wherein the plastic additive is activated. The activated areas are subsequently provided locally with an electrically conductive metallization as a microstrip line or conductor track. A particularly stable antenna device which is particularly compact with respect to installation space is thus implementable.

In one conceivable refinement, the hollow body is configured as (hollow) cylindrical or tubular, wherein the antenna arms are guided in a helix shape on the lateral surface, and wherein the antenna poles are electrically connected to one another by using an end-face ring conductor. The embodiment of the hollow body as a (hollow) cylinder has the advantage in this case, for example, that a trigger device can be applied to the ground plane in the center of the cylinder, in particular in the form of a push-button, without the antenna device influencing or blocking its actuation.

In an alternative refinement which is also conceivable, the hollow body is configured in the form of a hemisphere (hemispherical shell) or dome, wherein the antenna arms are guided in a spiral shape on the sphere surface (spherical shell surface), and wherein the antenna poles are electrically connected to one another by using a conductive contact surface in the area of a vertex. The refinement as a hemisphere or dome has the advantage in this case in particular of an organic shape, which enables the antenna device—and thus the hearing aid—to be made smaller and more compact with respect to installation space.

In one expedient embodiment, the housing front plate has an outwardly directed bulge or receptacle, in which the antenna device engages at least partially in a form-locking manner. This means that the antenna device extends in the bulge beyond the footprint of the housing front plate, it is thus ensured that the radiation and performance properties of the antenna device are less dependent on the respective individual ear shape.

Other features which are considered as characteristic for the invention are set forth in the appended claims.

Although the invention is illustrated and described herein as embodied in a hearing aid, in particular an in-the-ear hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
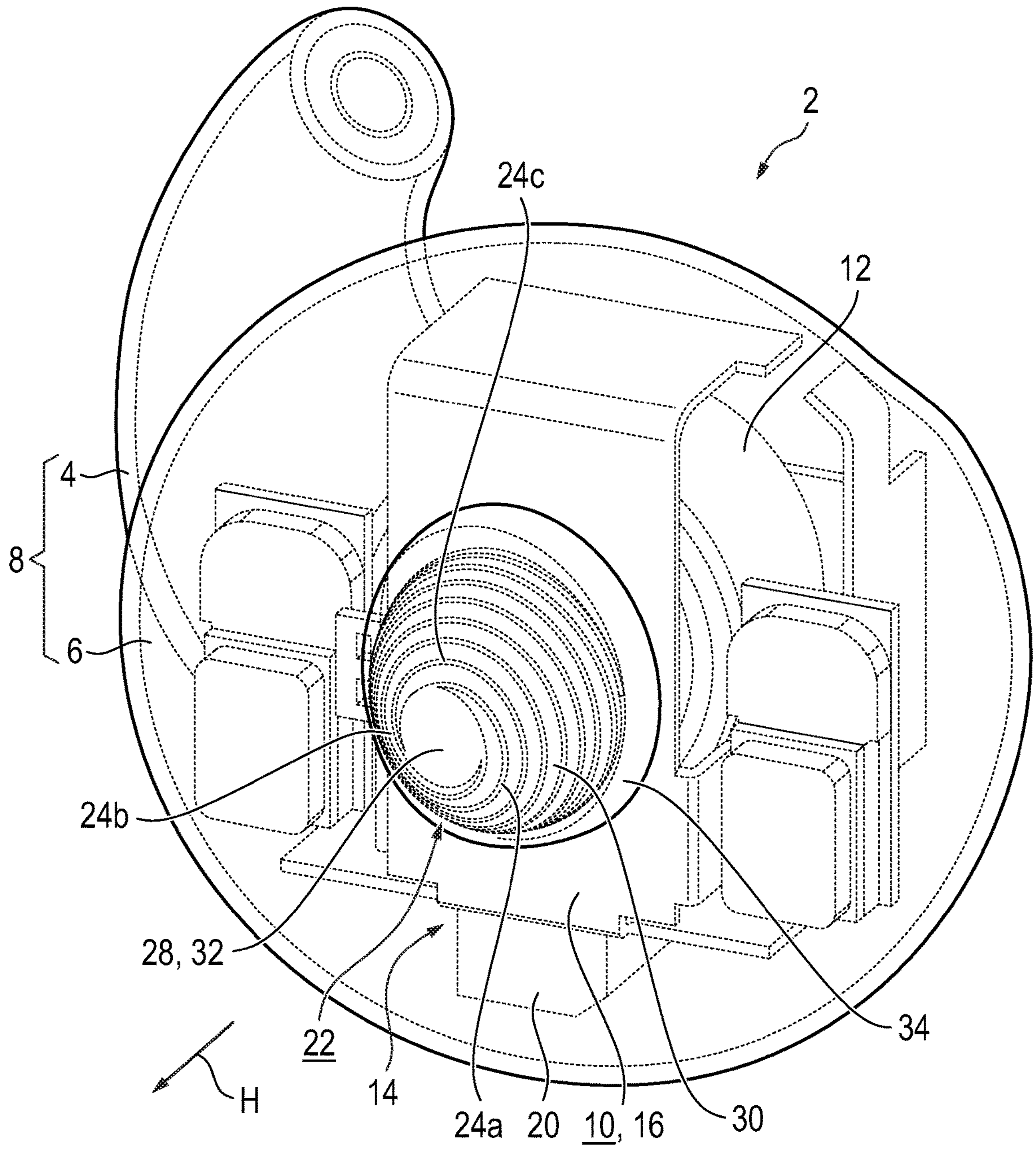
FIG. 1 is a diagrammatic, perspective view of an ITE hearing aid.
Figure 2:
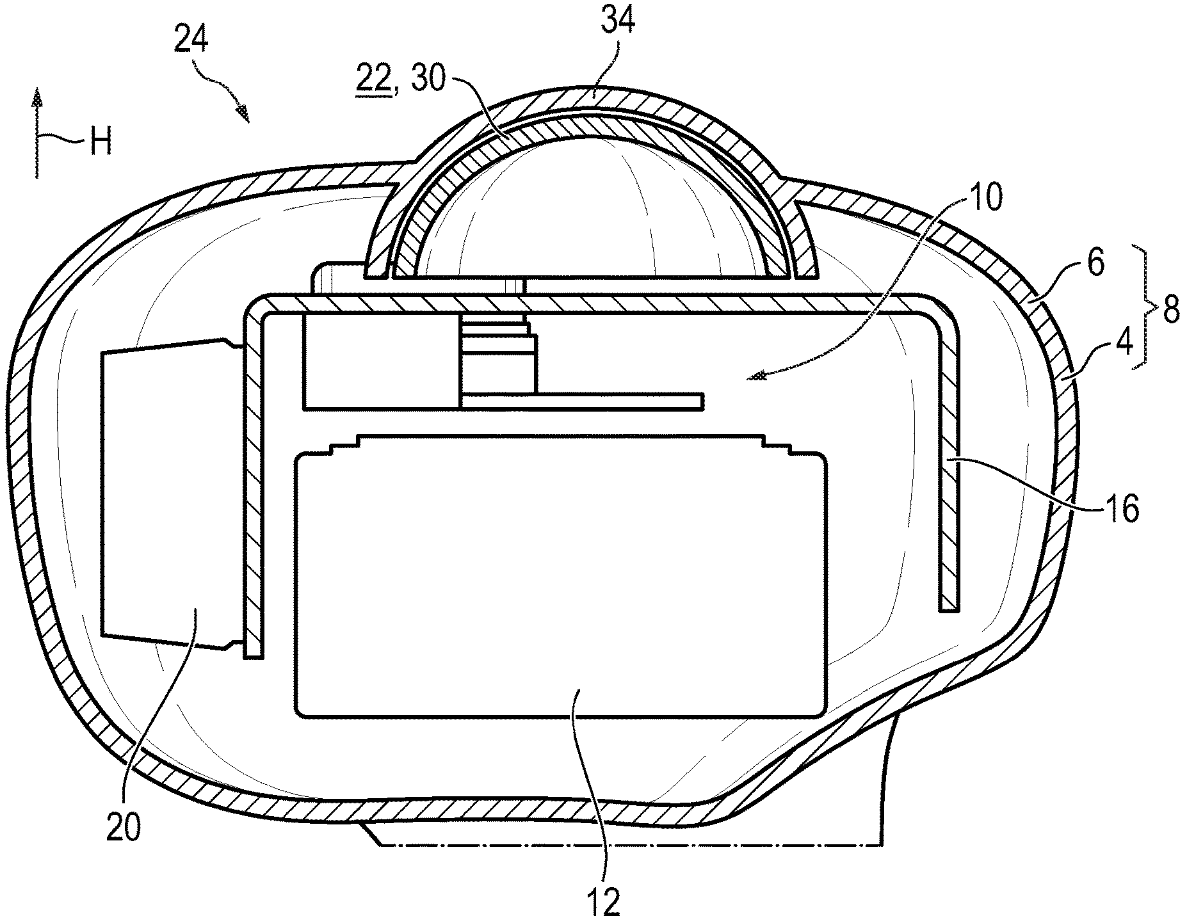
FIG. 2 is a sectional view of the ITE hearing aid.

Referring now in detail to the figures of the drawings, in which parts and dimensions corresponding to one another are always provided with the same reference numerals, and first, particularly, to FIGS. 1 and 2 thereof, there is seen a hearing aid 2 configured as an ITE hearing aid. The hearing aid 2 includes a housing shell (shell 4), which is adapted individually to an auditory canal of a hearing aid user and is closed by a cover-like housing front plate (faceplate) 6. In a device housing 8 formed by the housing shell 4 and the housing front plate 6, an installation space is accommodated, in which hearing aid components of the hearing aid 2 are disposed. A signal processing device 10 and a (hearing aid) battery 12 as well as a transceiver unit (transceiver) 14 for electromagnetic waves are shown in the figures by way of example.

The housing shell 4 and the housing front plate 6 can be embodied as separate components. A one-piece, thus integral or monolithic, device housing 8 is also conceivable.

The signal processing device 10 has in this case a motherboard having a printed circuit board (PCB) 16. The printed circuit board 16 has in this case an integrated ground plane 18 as a radio-frequency ground plane (RF ground plane). The approximately U-shaped printed circuit board 16 encloses the battery 12 at least in sections in this case, so that an arrangement which is compact with respect to installation space is implemented.

The transceiver unit 14 has two antenna devices 20, 22.

The antenna device 20 is embodied as a magnetic induction antenna and is disposed on one of the vertical U legs of the printed circuit board 16. The antenna device 20 is provided in this case, for example, for a wireless ear-to-ear connection (e2e) in a binaural hearing aid 2.

The antenna device 22 is suitable and configured, for example, for a wireless 2.4 GHz Bluetooth signal transmission in an ISM frequency band. The antenna device 22 is provided as a folded dipole having two (FIGS. 3 to 5) or three (FIGS. 6 to 9) folded antenna arms **24*a*, 24*b*, 24*c*, and is disposed between the ground plane 18 and the housing front plate 6**.

Figure 3:
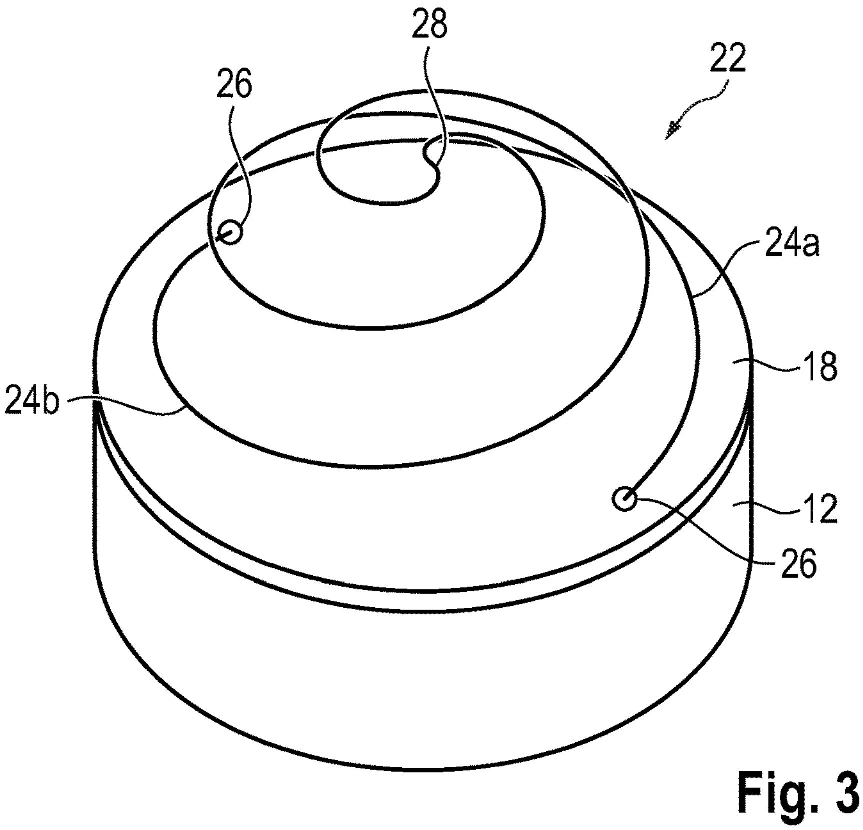
FIG. 3 is a detailed perspective view of an antenna device and a battery of the hearing aid.
Figure 4:
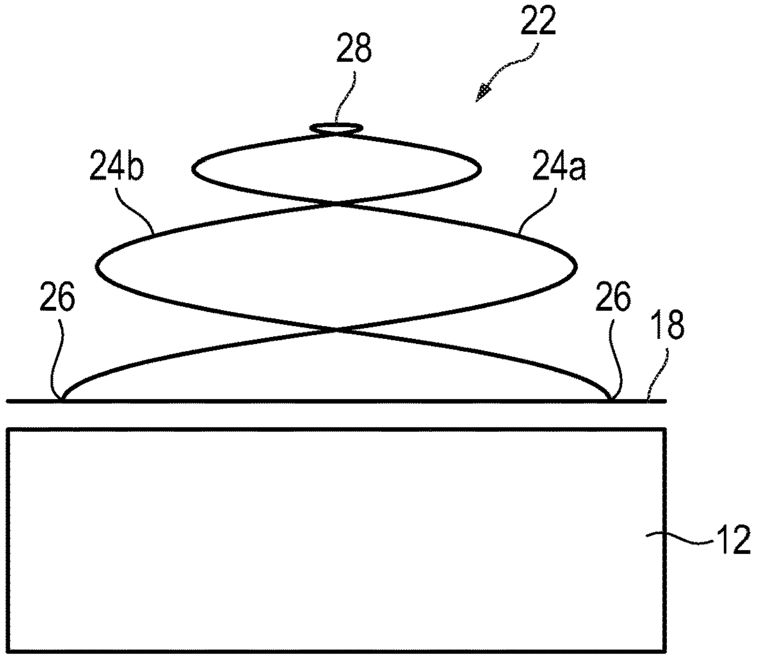
FIG. 4 is a side-elevational view of the antenna device and the battery.
Figure 5:
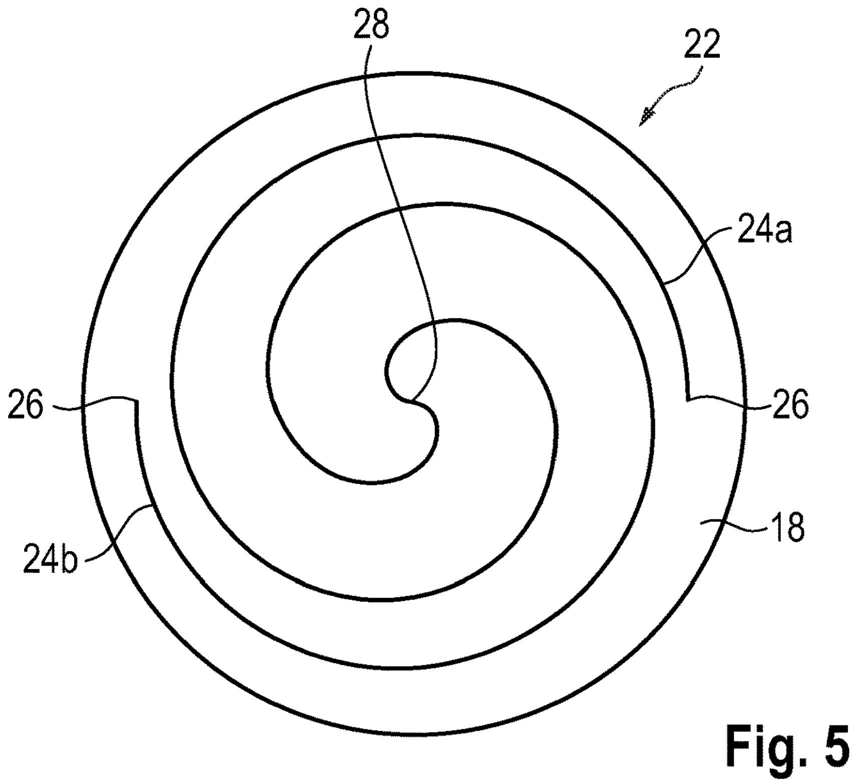
FIG. 5 is a top-plan view of the antenna device.
Figure 6:
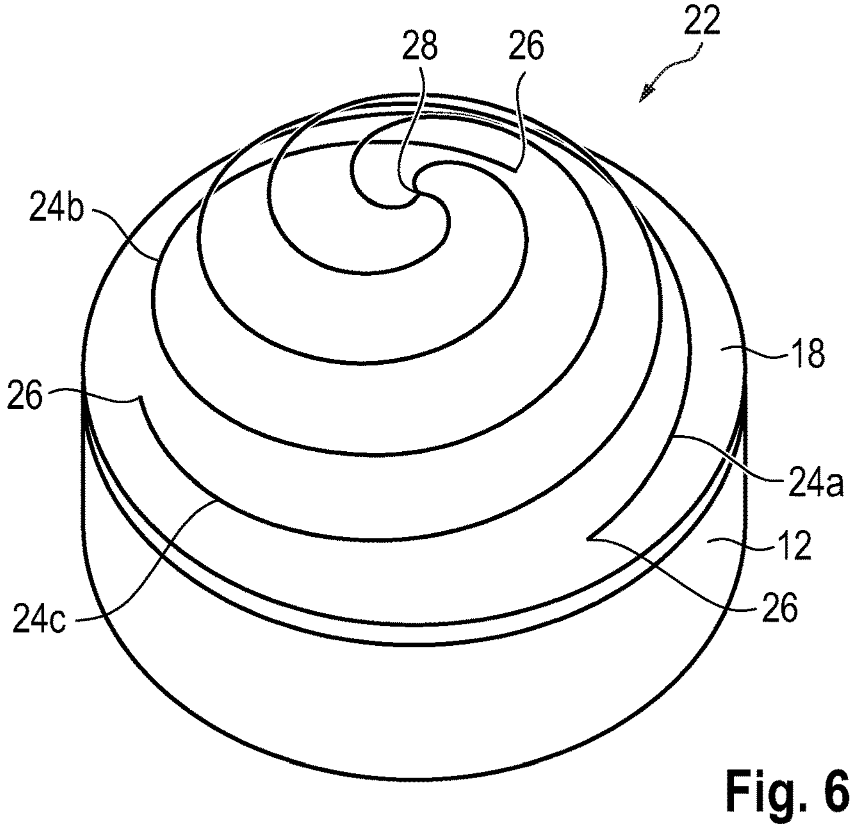
FIG. 6 is a detailed perspective view of a second embodiment of the antenna device and the battery.
Figure 7:
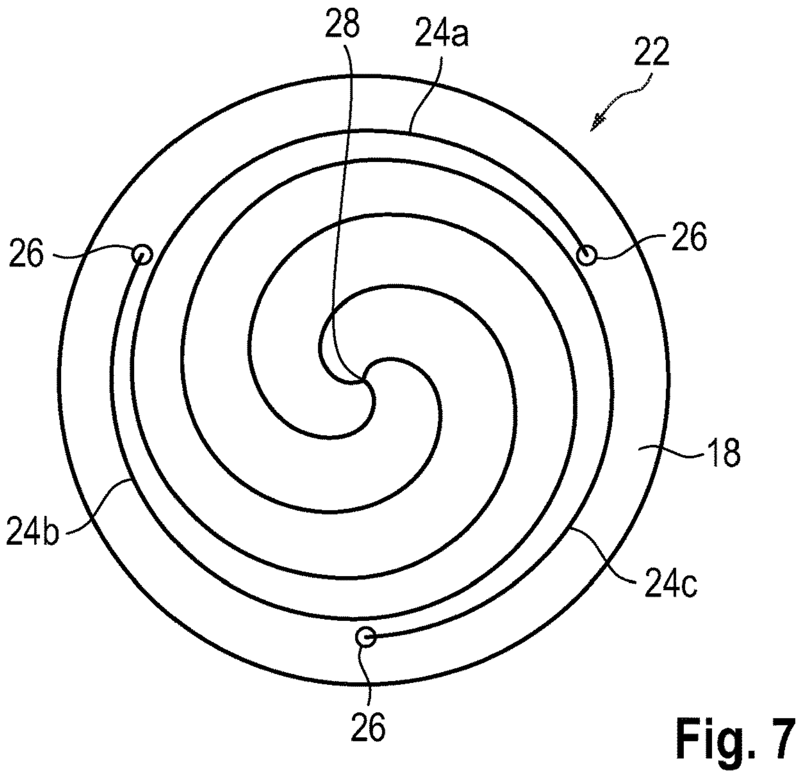
FIG. 7 is a top-plan view of the second embodiment of the antenna device.

As is shown in more detail in FIG. 3 to FIG. 5, for example, the antenna arms **24*a*, 24*b* are embodied volumetrically as two three-dimensional spherical spirals. The spherical spirals or antenna arms 24*a*, 24*b* extend and originate from the ground plane 18 along a height direction H, which points in the direction of an environment or outward perpendicularly to the ground plane 18 and in the worn state of the hearing aid 2. The antenna arms 24*a*, 24*b* each have one and one-half turns. The antenna arms 24*a*, 24*b* each have two antenna ends, which are embodied as antenna poles 26, 28. The antenna poles 26, 28 are used in this case to interconnect and contact the antenna arms 24*a*, 24*b*. The antenna pole 26 is in this case the antenna pole which is formed on an antenna end facing toward the ground plane 18, wherein the antenna pole 28 is accordingly the antenna pole which is disposed remotely from the ground plane 18**.

As is apparent in particular on the basis of the top view of FIG. 5, the antenna arms **24*a*, 24*b* are disposed rotationally symmetrically with respect to a central axis, which is oriented along the height direction H. In particular, the antenna arm 24*a* can be mapped by using a 180° rotation on the antenna arm 24*b*** and vice versa.

The antenna pole 26 of the antenna arm **24*a* is coupled in this case to a (signal) feed, wherein the antenna pole 26 of the antenna arm 24*b* is contacted with the ground plane 18. The antenna poles 28 of the antenna arms 24*a*, 24*b*** are interconnected with one another.

In the exemplary embodiment of FIGS. 6 to 9, the antenna device 22 has three antenna arms **24*a*, 24*b*, 24*c* guided as spherical spirals, which are disposed offset in relation to one another rotationally symmetrically by 120°. The antenna pole 26 of the antenna arm 24*a* is coupled in this case to a (signal) feed, wherein the antenna poles 26 of the antenna arms 24*b* and 24*c* are short-circuited with one another through the ground plane 18. The antenna poles 28 of the antenna arms 24*a*, 24*b*, 24*c*** are interconnected with one another.

Figure 8:
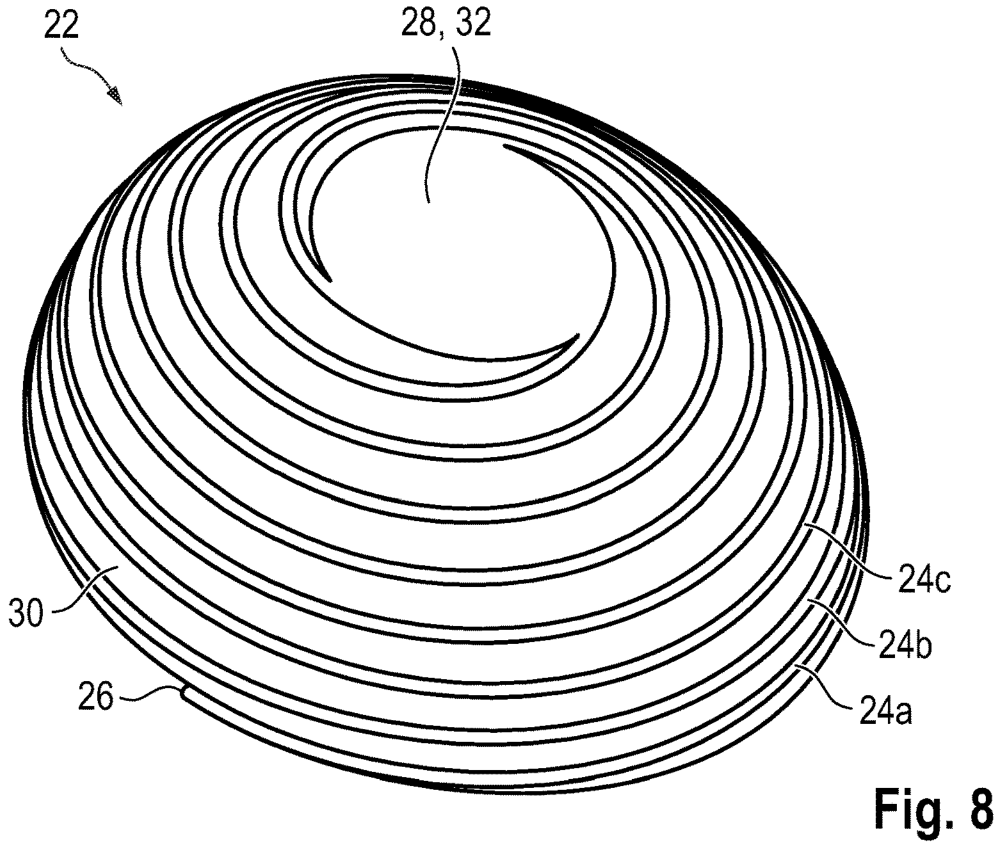
FIG. 8 is a perspective view of the second embodiment of the antenna device having a hollow body.
Figure 9:
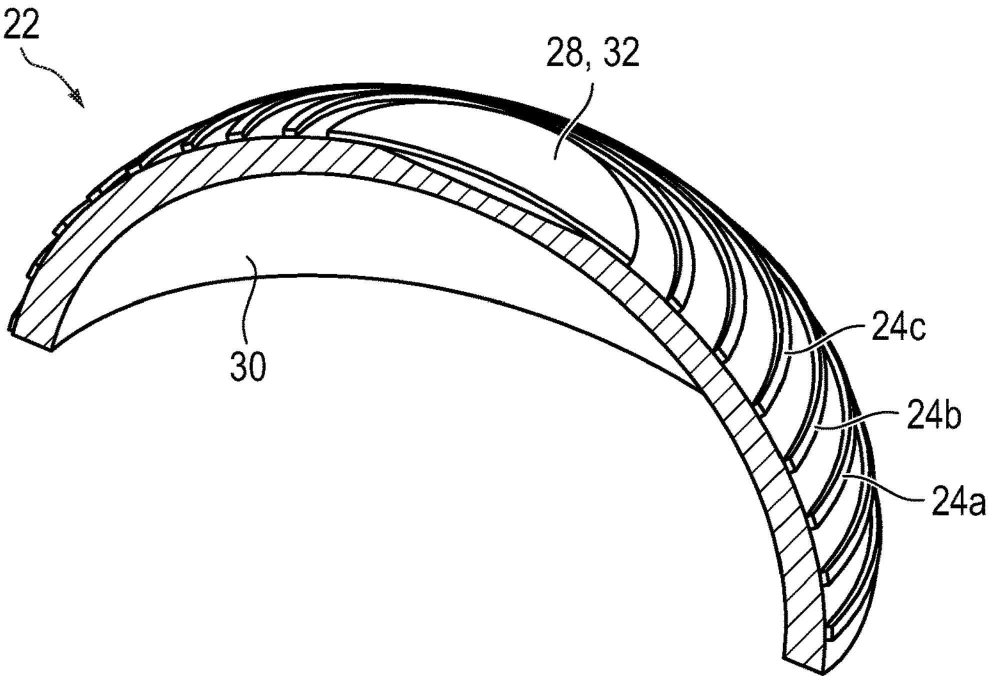
FIG. 9 is a sectional view of the hollow body.

In the embodiment shown in FIG. 8 and FIG. 9, the antenna device 22 has a hemispherical or dome-shaped hollow body 30 as a support structure for the antenna arms **24*a*, 24*b*, 24*c*. As is apparent in FIGS. 1 and 2, for example, the hollow body 30 is disposed above the ground plane 18, so that the printed circuit board 16 is overlapped in sections by the hollow body 30. The hollow body 30 is produced as an injection molded part from a plastic material suitable for laser direct structuring (LDS), wherein the antenna arms 24*a*, 24*b*, 24*c* are applied by using laser direct structuring to the hollow body 30, thus to an outer surface facing away from the ground plane 18. The mutual interconnection point or the antenna pole 28 is embodied in this case as a contact surface 32, which is disposed on the end face or in the area of a vertex of the hollow body 30**.

As shown in FIG. 1 and FIG. 2, the device housing 8 or the housing front plate 6 has a trough-like or bead-like bulge 34 or receptacle in this case, in which the hollow body 30 and the antenna arms **24*a*, 24*b*, 24*c*** engage in sections.

Figure 10:
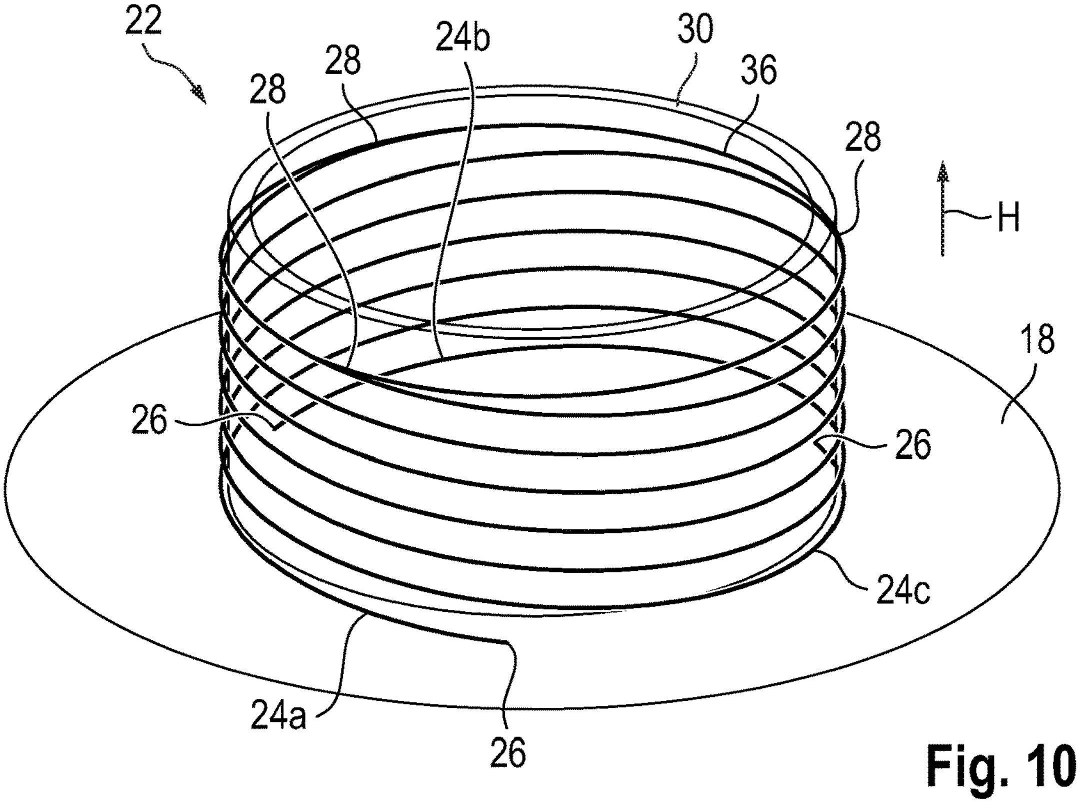
FIG. 10 is a perspective view of a third embodiment of the antenna device.
Figure 11:
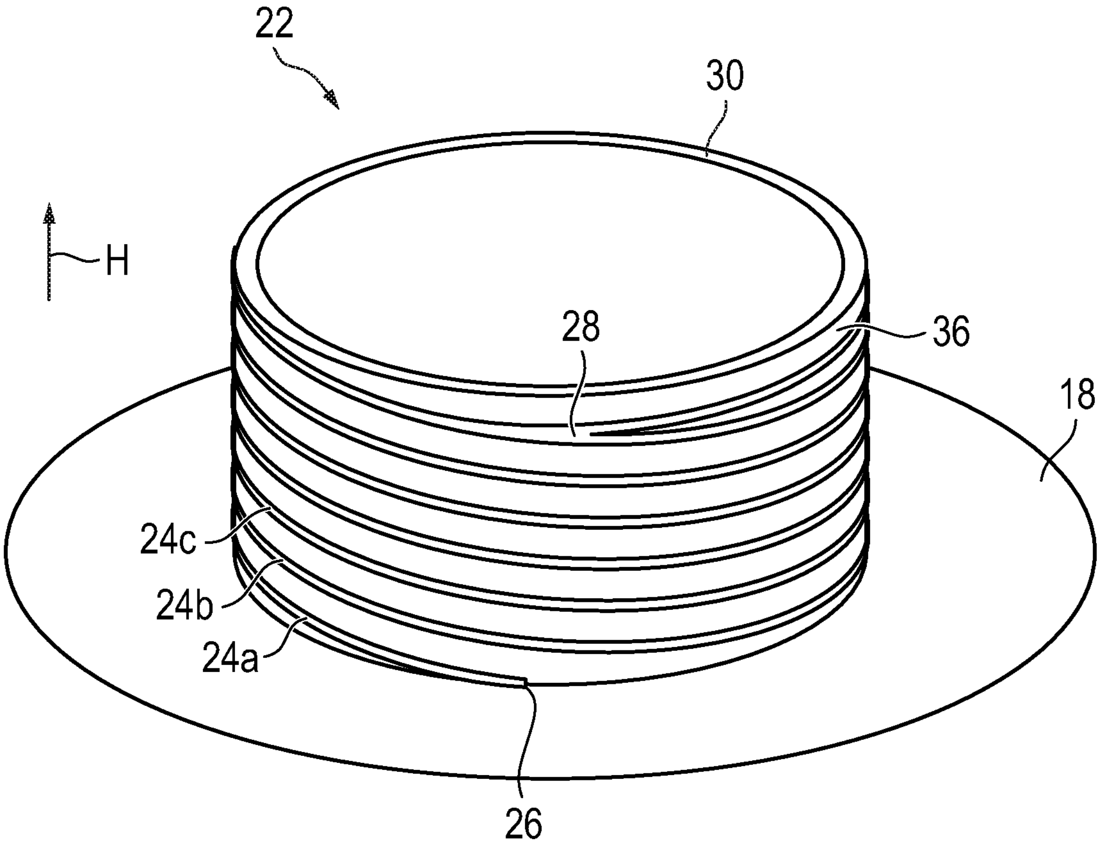
FIG. 11 is a perspective view of the third embodiment of the antenna device having a hollow body.

In the exemplary embodiment shown in FIG. 10 and FIG. 11, the antenna device 22 has three helical antenna arms **24*a*, 24*b*, 24*c*, which are guided on a lateral surface of a hollow-cylindrical or tubular hollow body 30. The antenna poles 28 are connected to one another in this case by using an end-face ring conductor 36. The antenna arms 24***a*, 24*b*, 24*c* each have two turns or pitches between the antenna poles 26, 28.

The claimed invention is not restricted to the above-described exemplary embodiments. Rather, other variants of the invention can be derived therefrom by a person skilled in the art in the scope of the disclosed claims, without leaving the subject matter of the claimed invention. In particular, all individual features described in conjunction with the various exemplary embodiments can furthermore be combined in another way in the scope of the disclosed claims, without leaving the subject matter of the claimed invention.

The following is a summary list of reference numerals and the corresponding structure used in the above description of the invention.

LIST OF REFERENCE SIGNS

2 hearing aid
4 housing shell
6 housing front plate
8 device housing
10 signal processing device
12 battery
14 transceiver unit
16 printed circuit board
18 ground plane
20 antenna device
22 antenna device
24*a*, 24*b*, 24*c* antenna arm
26 antenna pole
28 antenna pole
30 hollow body
32 contact surface
34 bulge
36 ring conductor
H height direction

The invention claimed is:

1. A hearing aid or an in-the-ear hearing aid, comprising:
a device housing having a housing shell insertable into an auditory canal, said device housing having a housing front plate closing said housing shell;
a battery accommodated in said device housing;
a signal processing device having a ground plane, said signal processing device disposed at least in sections between said battery and said housing front plate; and
an antenna device having at least two folded antenna arms, said antenna device disposed between said ground plane and said housing front plate;
said antenna arms extending as three-dimensional spirals or helices along a height direction perpendicular to said ground plane, and said antenna arms having at least one turn or pitch;
said antenna arms having antenna poles spaced apart from said ground plane, said antenna poles electrically connecting said antenna arms to one another; and
wherein said housing front plate has an outwardly directed bulge, and said antenna device form-lockingly engages in said outwardly directed bulge.

2. The hearing aid according to claim 1, wherein said antenna arms of said antenna device are disposed rotationally symmetrically in relation to one another with respect to the height direction.

3. The hearing aid according to claim 1, wherein said antenna device has precisely three of said antenna arms.

4. The hearing aid according to claim 1, wherein said antenna device has a hollow body overlapping said ground plane, and said antenna arms are disposed on a surface of said hollow body.

5. The hearing aid according to claim 4, wherein said hollow body is formed of an electrically nonconductive material.

6. The hearing aid according to claim 4, wherein said hollow body is formed of a plastic material suitable for laser direct structuring, and said antenna arms are laser direct structured to said hollow body.

7. The hearing aid according to claim 4, wherein said hollow body is cylindrical, said antenna arms are guided in a helix shape on a lateral surface of said cylindrical hollow body, and a ring conductor electrically connects said antenna poles to one another.

8. The hearing aid according to claim 4, wherein said hollow body is hemispherical, said antenna arms are guided in a spiral shape on a sphere surface of said hemispherical hollow body, and said hollow body has a conductive contact surface electrically connecting said antenna poles to one another.

9. A hearing aid or an in-the-ear hearing aid, comprising:
a device housing having a housing shell insertable into an auditory canal, said device housing having a housing front plate closing said housing shell;
a battery accommodated in said device housing;
a signal processing device having a ground plane, said signal processing device disposed at least in sections between said battery and said housing front plate; and
an antenna device having at least two folded antenna arms, said antenna device disposed between said ground plane and said housing front plate;
said antenna arms extending as three-dimensional spirals or helices along a height direction perpendicular to said ground plane, and said antenna arms having at least one turn or pitch;
said antenna arms having antenna poles spaced apart from said ground plane, said antenna poles electrically connecting said antenna arms to one another;
said antenna device having a cylindrical hollow body overlapping said ground plane, and said antenna arms being disposed on a surface of said hollow body; and
said antenna arms being guided in a helix shape on a lateral surface of said cylindrical hollow body, and wherein a ring conductor electrically connects said antenna poles to one another.

10. The hearing aid according to claim 9, wherein said hollow body is hemispherical, said antenna arms are guided in a spiral shape on a sphere surface of said hemispherical hollow body, and said hollow body has a conductive contact surface electrically connecting said antenna poles to one another.

* * * * *